(12) United States Patent
Asuka et al.

(10) Patent No.: US 11,572,088 B2
(45) Date of Patent: Feb. 7, 2023

(54) RAIL BREAK DETECTION DEVICE

(71) Applicant: MITSUBISHI ELECTRIC CORPORATION, Tokyo (JP)

(72) Inventors: Masashi Asuka, Tokyo (JP); Wataru Tsujita, Tokyo (JP); Tomoaki Takewa, Tokyo (JP); Yoshitsugu Sawa, Tokyo (JP); Daisuke Koshino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1100 days.

(21) Appl. No.: 16/079,696

(22) PCT Filed: Apr. 4, 2017

(86) PCT No.: PCT/JP2017/014136
§ 371 (c)(1),
(2) Date: Aug. 24, 2018

(87) PCT Pub. No.: WO2017/175768
PCT Pub. Date: Oct. 12, 2017

(65) Prior Publication Data
US 2019/0300032 A1 Oct. 3, 2019

(30) Foreign Application Priority Data

Apr. 4, 2016 (WO) .................. PCT/JP2016/061033

(51) Int. Cl.
*G01M 5/00* (2006.01)
*G01H 1/00* (2006.01)
(Continued)

(52) U.S. Cl.
CPC ............. *B61L 23/044* (2013.01); *B61L 27/53* (2022.01); *G01H 1/00* (2013.01); *G01M 5/0033* (2013.01); *G01M 5/0066* (2013.01)

(58) Field of Classification Search
CPC ..... B61L 23/044; B61L 27/0088; G01H 1/00; G01M 5/0033; G01M 5/0066; G01M 7/02
See application file for complete search history.

(56) References Cited

U.S. PATENT DOCUMENTS 5,743,495 A * 4/1998 Welles, II ............. B61L 23/047
246/169 R
2003/0187605 A1* 10/2003 Mathews, Jr. ........... B61K 9/04
702/134

(Continued)

FOREIGN PATENT DOCUMENTS

CZ 23860 U1 * 5/2012
DE 41 16 650 A1 11/1992
(Continued)

OTHER PUBLICATIONS

Extended European Search Report dated Apr. 16, 2019, issued by the European Patent Office in corresponding European Application No. 17779146.4. (8 pages).

(Continued)

*Primary Examiner* — Stephanie E Bloss
(74) *Attorney, Agent, or Firm* — Buchanan Ingersoll & Rooney PC

(57) ABSTRACT

A rail break detection device to which an output waveform from a vibration sensor, which is a first vibration sensor, and an output waveform from a vibration sensor, which is a second vibration sensor, are input, the vibration sensors being mounted on different positions of rails, includes a waveform similarity determination unit to compare impulse waveforms separated from the output waveforms or compare continuous waveforms separated from the output waveforms, and determine similarity therebetween, and detects a break of a rail.

16 Claims, 11 Drawing Sheets

(51) Int. Cl.
  *B61L 23/04*   (2006.01)
  *B61L 27/53*   (2022.01)

(56) References Cited

U.S. PATENT DOCUMENTS

| | | | | |
|---|---|---|---|---|
| 2004/0261533 | A1* | 12/2004 | Davenport | B61L 1/06 |
| | | | | 73/659 |
| 2006/0076461 | A1* | 4/2006 | DeRose | B61K 9/00 |
| | | | | 246/122 R |
| 2008/0234964 | A1* | 9/2008 | Miyasaka | G01M 13/04 |
| | | | | 702/113 |
| 2012/0279308 | A1* | 11/2012 | Yan | B61L 23/044 |
| | | | | 73/636 |
| 2015/0068296 | A1* | 3/2015 | Lanza di Scalea | G01D 5/12 |
| | | | | 73/146 |
| 2016/0207552 | A1* | 7/2016 | Mian | B61L 15/0072 |
| 2018/0273066 | A1* | 9/2018 | Mulligan | B61L 27/40 |
| 2019/0300032 | A1* | 10/2019 | Asuka | G01M 5/0033 |

FOREIGN PATENT DOCUMENTS

| | | | | |
|---|---|---|---|---|
| GB | 2 372 569 | A | | 8/2002 |
| JP | 07333054 | A | | 12/1995 |
| JP | 11118770 | A | | 4/1999 |
| JP | 2007170815 | A | * | 7/2007 ............ G01H 1/003 |
| JP | 2008151560 | A | * | 7/2008 |
| JP | 2010096541 | A | * | 4/2010 |
| JP | 2015034452 | A | | 2/2015 |
| WO | WO-2014027977 | A1 | * | 2/2014 ............ B61L 23/044 |

OTHER PUBLICATIONS

Office Action dated Jun. 3, 2020, issued in corresponding Indian Patent Application No. 201847034400, 6 pages.

International Search Report (PCT/ISA/210) dated Apr. 26, 2016, by the Japanese Patent Office as the International Searching Authority for International Application No. PCT/JP2016/061033.

* cited by examiner

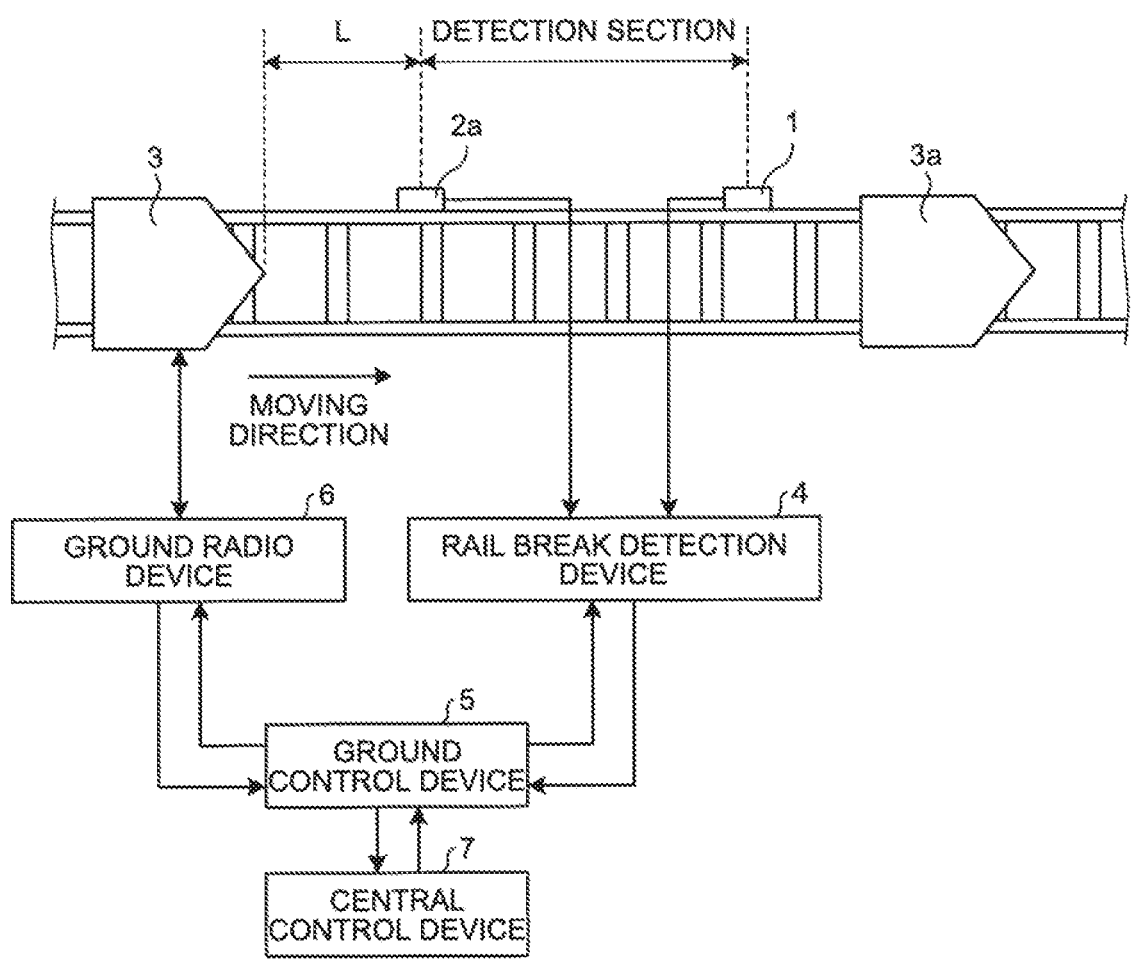

ary determination unit does not include a continuous waveform similarity determination unit in the first embodiment.

FIG. 5 is a flowchart illustrating operation of the rail break detection device in a case where the waveform similarity determination unit does not include an impulse waveform similarity determination unit in the first embodiment.

FIG. 6 is a graph illustrating vibration waveforms when no break is present on two rails in the first embodiment.

FIG. 7 is a graph illustrating vibration waveforms when a break is present on either of two rails in the first embodiment.

FIG. 8 is a diagram illustrating a typical hardware configuration for implementing the rail break detection device according to the first embodiment.

FIG. 9 is a diagram illustrating a rail break detection device according to a second embodiment and structures in the vicinity.

FIG. 10 is a first diagram illustrating a rail break detection device according to a third embodiment and structures in the vicinity.

FIG. 11 is a second diagram illustrating a rail break detection device according to the third embodiment and structures in the vicinity.

FIG. 12 is a first diagram illustrating a rail break detection device according to a fourth embodiment and structures in the vicinity.

FIG. 13 is a second diagram illustrating a rail break detection device according to the fourth embodiment and structures in the vicinity.

FIG. 14 is a first diagram illustrating a rail break detection device according to a fifth embodiment and structures in the vicinity.

FIG. 15 is a second diagram illustrating a rail break detection device according to the fifth embodiment and structures in the vicinity.

RAIL BREAK DETECTION DEVICE

FIELD

The present invention relates to a rail break detection device.

BACKGROUND

Patent Literature 1, which is a related art, discloses a technology for detecting a break on a rail by determination using a threshold of vibration information from a vibration sensor provided on the rail.

CITATION LIST

Patent Literature

Patent Literature Japanese Patent Application Laid-open No. 2015-34452

SUMMARY

Technical Problem

In the related art, however, resonance frequencies of rails are used for detection of a break on a rail. There is thus a problem in which a threshold for determination has to be set for each environment in which rails are laid.

The present invention has been made in view of the above, and an object thereof is to provide a rail break detection device that can be achieved regardless of the environment in which rails are laid.

Solution to Problem

In order to solve the aforementioned problems and achieve the object, in a rail break detection device to which output waveforms are input from a plurality of vibration sensors mounted on different positions on rails, the rail break detection device according to the present invention, includes a waveform similarity determination unit to compare impulse waveforms separated from the output waveforms output from the vibration sensors or compare continuous waveforms separated from the output waveforms, and determine similarity between the impulse waveforms or the continuous waveforms. Additionally, a break of the rails is detected on the basis of the similarity.

Advantageous Effects of Invention

According to the present invention, an effect of providing a rail break detection device that can be achieved regardless of the environment in which rails are laid is produced.

DESCRIPTION OF EMBODIMENTS

Rail break detection devices according to certain embodiments of the present invention will be described in detail below with reference to the drawings. Note that the present invention is not limited to the embodiments.

First Embodiment

Figure 1:
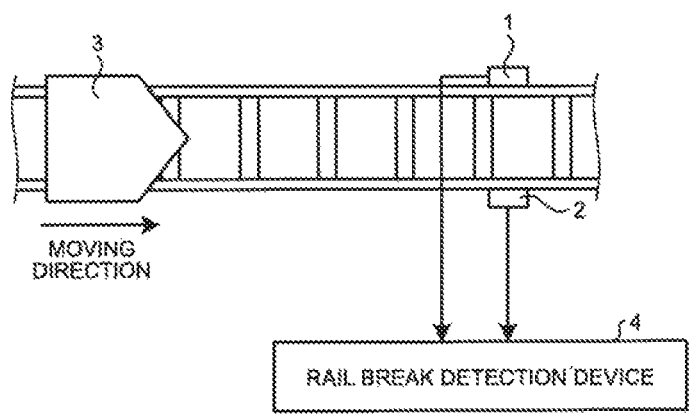
FIG. 1 is a diagram illustrating a rail break detection device according to a first embodiment and structures in the vicinity.

FIG. 1 is a diagram illustrating a rail break detection device 4 according to a first embodiment of the present invention and structures in the vicinity. FIG. 1 illustrates a vibration sensor 1, which is a first vibration sensor mounted on one of two rails, a vibration sensor 2, which is a second vibration sensor mounted on the other of the two rails at a position facing the vibration sensor 1, a train 3 that moves along the two rails, and the rail break detection device 4. Thus, the vibration sensors 1 and 2 are mounted on different rails from each other, which are parallel to each other. The vibration sensors 1 and 2 measure vibration of the rails. The train 3 is moving along the two rails in the direction toward the vibration sensors 1 and 2.

Figure 2:
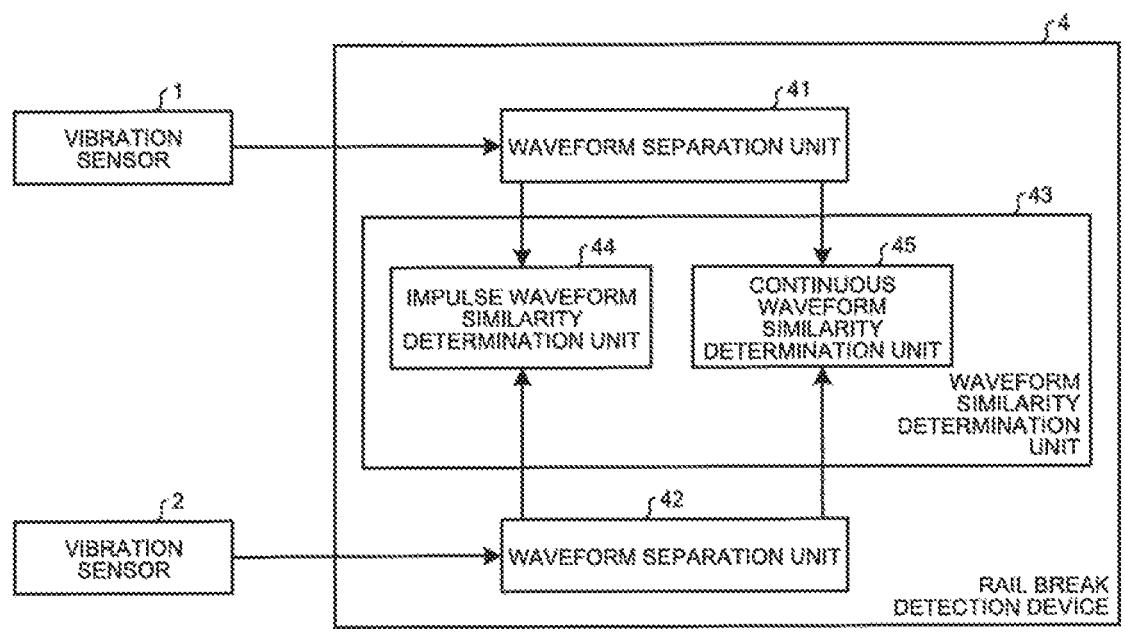
FIG. 2 is a diagram illustrating a configuration of the rail break detection device according to the first embodiment, and vibration sensors.

FIG. 2 is a diagram illustrating a configuration of the rail break detection device 4 according to the first embodiment, and the vibration sensor 1 and 2. The rail break detection device 4 illustrated in FIG. 2 includes waveform separation units 41 and 42, and a waveform similarity determination unit 43. The waveform similarity determination unit 43 includes an impulse waveform similarity determination unit 44, and a continuous waveform similarity determination unit 45.

The waveform separation unit 41, which is a first waveform separation unit, separates a waveform output from the vibration sensor 1 into an impulse waveform and a continuous waveform and outputs the impulse waveform and the continuous waveform. The impulse waveform, which is a forced vibration component, will be referred to as a first impulse waveform for convenience sake, and the continuous waveform, which is a free vibration component, will be referred to as a first continuous waveform for convenience sake. The waveform separation unit 42, which is a second waveform separation unit, separates a waveform output from the vibration sensor 2 into an impulse waveform and a continuous waveform and outputs the impulse waveform and the continuous waveform. The impulse waveform will be referred to as a second impulse waveform for convenience sake, and the continuous waveform will be referred to as a second continuous waveform for convenience sake. Note that examples of methods for waveform separation include waveform analysis, time frequency analysis, Fourier analysis, wavelet analysis, and sparse analysis.

The waveform similarity determination unit 43 compares a waveform output from the waveform separation unit 41 with a waveform output from the waveform separation unit 42 to determine similarity between the waveforms by using the impulse waveform similarity determination unit 44 or the continuous waveform similarity determination unit 45, and detects a rail break from the similarity. The waveform similarity determination unit 43 compares impulse waveforms by using the impulse waveform similarity determination unit 44 when the train 3 moves toward the vibration sensors 1 and 2, and compares continuous waveforms by using the continuous waveform similarity determination unit 45 when the train 3 moves away from the vibration sensors 1 and 2. When the train 3 moves toward the vibration sensors 1 and 2, impulse waveforms are used for similarity determination because the impulse waveform components are large; when the train 3 moves away from the vibration sensors 1 and 2, continuous waveform components are used for similarity determination because the impulse waveform components are attenuated.

The impulse waveform similarity determination unit 44 compares the first impulse waveform from the waveform separation unit 41 with the second impulse waveform from the waveform separation unit 42 to determine similarity between the impulse waveforms.

The continuous waveform similarity determination unit 45 compares the first continuous waveform from the waveform separation unit 41 with the second continuous waveform from the waveform separation unit 42 to determine similarity between the continuous waveforms.

Note that examples of waveform comparison for determining waveform similarity include a method of comparing root mean square (RMS) values. In a case where RMS values are compared, it is determined that no rail break has occurred when the ratio of the RMS values of vibration strength is within a predetermined threshold range, and it is determined that a rail break has occurred when the ratio of the RRS values of vibration strength is not within the predetermined threshold range. Alternatively, for waveform comparison for determination of waveform similarity, highest values of impulse vibration may be compared or correlation values of time-series data may be compared.

Figure 3:
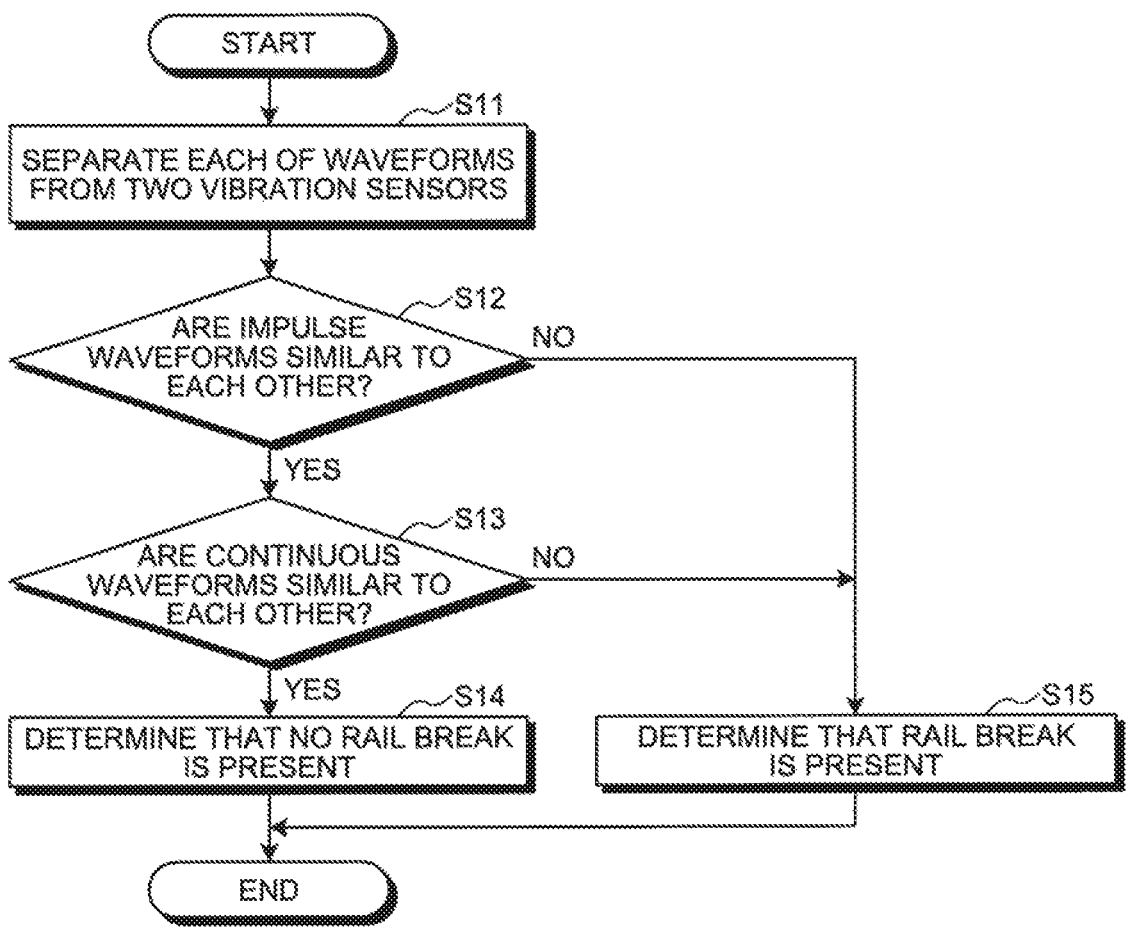
FIG. 3 is a flowchart illustrating operation of the rail break detection device in the first embodiment.

FIG. 3 is a flowchart illustrating operation of the rail break detection device 4 in the first embodiment. First, processing is started, and the waveform separation units 41 and 42 separate waveforms from the two vibration sensors 1 and 2, respectively, into impulse waveforms, which are forced vibration components, and continuous waveforms, which are free vibration components (S11). Subsequently, the impulse waveform similarity determination unit 44 determines whether or not the two impulse waveforms obtained by the separation are similar to each other (S12). If the impulse waveforms are similar to each other (S12: Yes), the continuous waveform similarity determination unit 45 determines whether or not the two continuous waveforms obtained by the separation are similar to each other (S13). If the continuous waveforms are similar to each other (S13: Yes), the waveform similarity determination unit 43 determines that no rail break is present (S14), and terminates the processing. If the impulse waveforms are not similar to each other (S12: No) or if the continuous waveforms are not similar to each other (S13: NO), the waveform similarity determination unit 43 determines that a rail break is present (S15), and terminates the processing.

While the waveform similarity determination unit 43 illustrated in FIG. 2 includes both of the impulse waveform similarity determination unit 44 and the continuous waveform similarity determination unit 45, the present invention is not limited thereto, and the waveform similarity determination unit 43 may include at least either one of the impulse waveform similarity determination unit 44 and the continuous waveform similarity determination unit 45. In a case where the waveform similarity determination unit 43 does not include the impulse waveform similarity determination unit 44 but includes the continuous waveform similarity determination unit 45, determination on the similarity of waveforms may be performed when the train 3 moves away from the vibration sensors 1 and 2.

Figure 4:
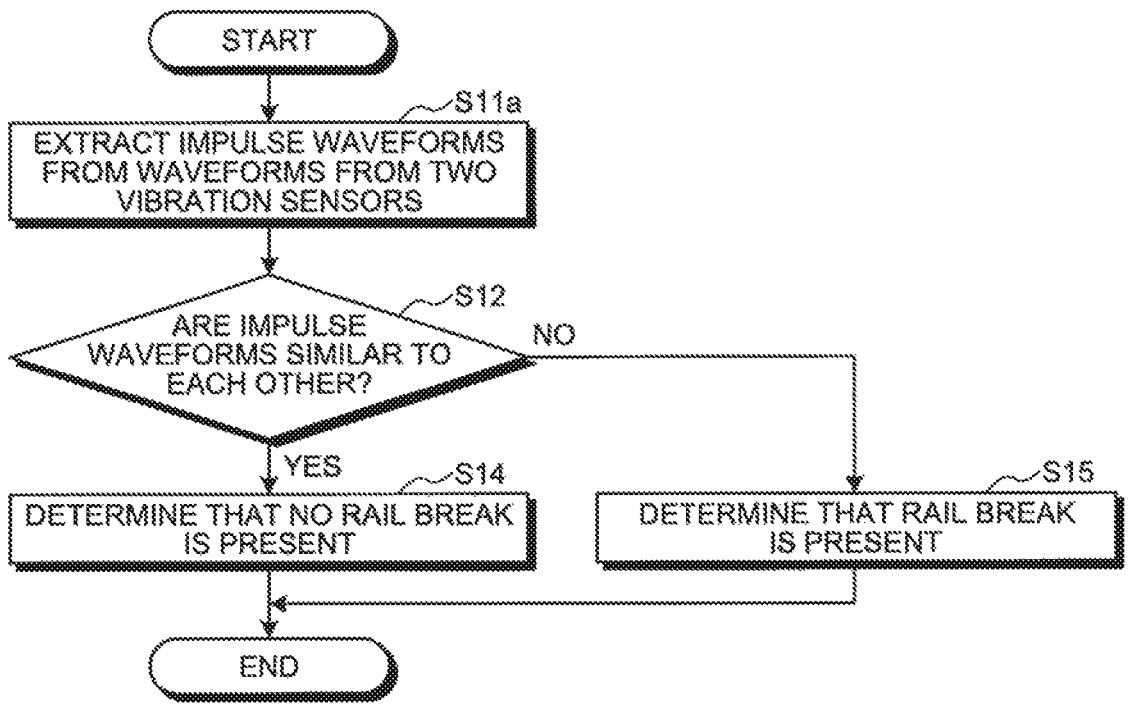
FIG. 4 is a flowchart illustrating operation of the rail break detection device in a case where a waveform similarity

FIG. 4 is a flowchart illustrating operation of the rail break detection device 4 in a case where the waveform similarity determination unit 43 does not include the continuous waveform similarity determination unit 45 in the first embodiment. First, processing is started, and the waveform separation units 41 and 42 extract impulse waveforms, which are forced vibration components, from waveforms from the two vibration sensors, respectively (S11a). Subsequently, the impulse waveform similarity determination unit 44 determines whether or not the extracted impulse waveforms are similar to each other (S12). If the impulse waveforms are similar to each other (S12: Yes), the waveform similarity determination unit 43 determines that no rail break is present (S14), and terminates the processing. If the impulse waveforms are not similar to each other (S12: No), the waveform similarity determination unit 43 determines that a rail break is present (S15) and terminates the processing.

Figure 5:
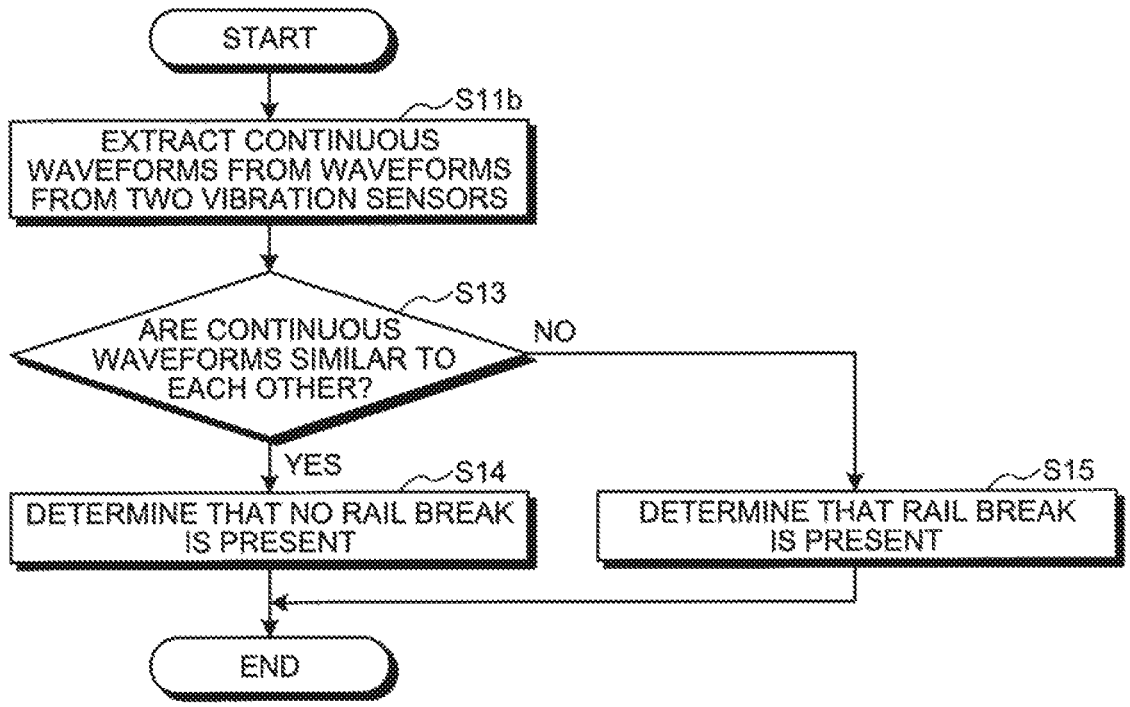

FIG. 5 is a flowchart illustrating operation of the rail break detection device 4 in a case where the waveform similarity determination unit 43 does not include the impulse waveform similarity determination unit 14 in the first embodiment. First, processing is started, and the waveform separation units 41 and 42 extract continuous waveforms, which are free vibration components, from waveforms from the two vibration sensors, respectively (S11b). Subsequently, the continuous waveform similarity determination unit 45 determines whether or not the extracted continuous waveforms are similar to each other (S13). If the continuous waveforms are similar to each other (S13: Yes), the waveform similarity determination unit 43 determines that no rail break is present (S14), and terminates the processing. If the continuous waveforms are not similar to each other (S13: No), the waveform similarity determination unit 43 determines that a rail break is present (S15), and terminates the processing.

Although not illustrated in FIGS. 3 to 5, output of the result of detection of the presence or absence of a rail break to a railroad map, a display device, a signal, or the like, for example, allows users to know the presence or absence of the rail break. Note that the information given to users through a railroad map, a display device, a signal, or the like may be train availability information instead of the presence or absence of a rail break.

Figure 6:
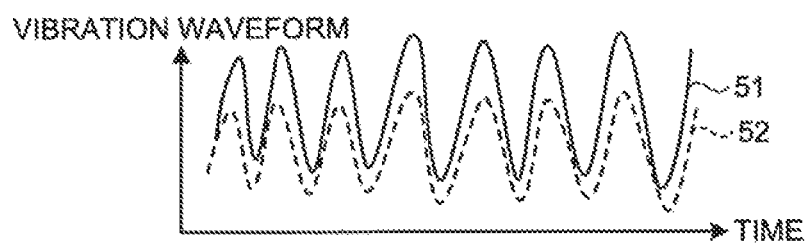
Figure 7:
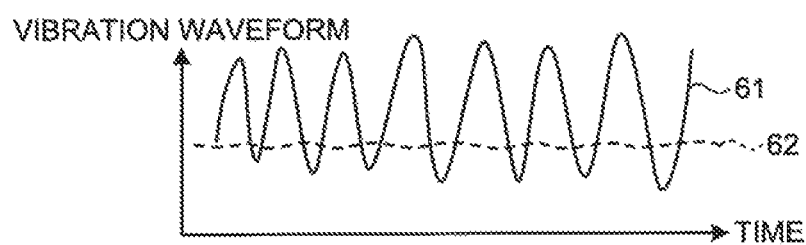

FIG. 6 is a graph illustrating vibration waveforms when no break is present on two rails in the first embodiment. In addition, FIG. 7 is a graph illustrating vibration waveforms when a break is present on either of two rails in the first embodiment. In FIG. 6, since no break is present on the two rails, an output waveform 51 from the vibration sensor 1 and an output waveform 52 from the vibration sensor 2 have waveform profiles similar to each other. In FIG. 7, since a break is present on a rail on which the vibration sensor 2 is mounted, an output waveform 61 from the vibration sensor 1 and an output waveform 62 from the vibration sensor 2 have waveform profiles dissimilar to each other.

As described above, according to the present embodiment, waveforms output from a plurality of vibration sensors mounted on two rails at positions facing each other are compared and similarity between the waveforms is determined, so that a difference between the conditions of the two rails is detected without thresholds for determination set for each environment in which rails are laid, which allows detection of a rail break regardless of the environment in which the rails are laid. In addition, an output waveform from a vibration sensor is separated into an impulse waveform and a continuous waveform, which improves accuracy of the detection.

Figure 8:
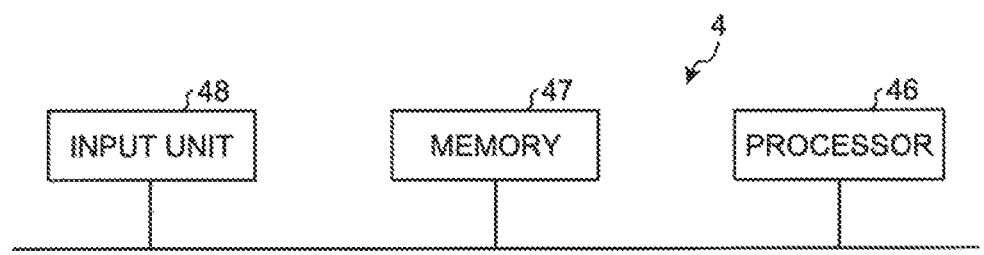

Note that, in the present embodiment described above, the rail break detection device 4 includes at least a processor, a memory, and an input unit, and operation of each component is implemented by software. FIG. 8 is a diagram illustrating a typical hardware configuration for implementing the rail break detection device 4 according to the present embodiment. The device illustrated in FIG. 8 includes a processor 46, a memory 47, and an input unit 48. The processor 46 performs computation and control by software by using received data. The memory 47 stores received data, stores data necessary for the processor 46 to perform computation and control, and stores software for the processor 46 to perform computation and control. The input unit 48 inputs output waveforms from the vibration sensors 1 and 2. The waveform separation units 41 and 42 are implemented by the processor 46, the memory 47, and the input unit 48, and the waveform similarity determination unit 43 is implemented by the processor 46 and the memory 47. Note that a plurality of processors 46 and a plurality of memories 47 may be provided.

Second Embodiment

While an embodiment in which two vibration sensors are mounted on different rails has been described in the first embodiment, the present invention is not limited thereto. Two vibration sensors may be mounted on one rail as presented in the present embodiment. Note that, for details in the present embodiment that have already been described in the first embodiment, the first embodiment is to be referred to and redundant description will not be repeated.

Figure 9:
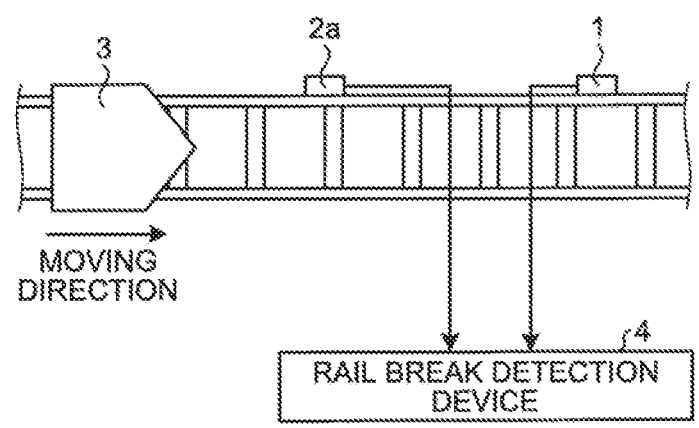

FIG. 9 is a diagram illustrating a rail break detection device 4 according to the second embodiment of the present invention and structures in the vicinity. FIG. 9 illustrates the vibration sensor 1, which is the first vibration sensor mounted on one of two rails, a vibration sensor 2a, which is the second vibration sensor mounted on the same rail as the rail on which the vibration sensor 1 is mounted, the train 3 that moves along the two rails, and the rail break detection device 4. The vibration sensors 1 and 2a measure vibration of the rail. The train 3 is moving along the two rails in the direction toward the vibration sensors 1 and 2a. Note that the rail on which a break can be detected by the vibration sensors 1 and 2a is the rail on which the vibration sensors 1 and 2a are mounted. Although not illustrated, assume that vibration sensors are also mounted on the rail on which the vibration sensors 1 and 2a are not mounted similarly to the vibration sensors 1 and 2a.

AB illustrated in FIG. 9, in a case where the vibration sensor 1 and the vibration sensor 2a are mounted on one rail as well, the output waveform 51 from the vibration sensor 1 and the output waveform 52 from the vibration sensor 2a have waveform profiles similar to each other when no break is present on the two rails, and the output waveform from the vibration sensor 1 and the output waveform from the vibration sensor 2a have waveform profiles dissimilar to each other when a break is present on the rail on which the vibration sensor 2a is mounted. Note that, when a break is present on a rail, the output waveform from the vibration sensor 1 and the output waveform from the vibration sensor 2a have waveform profiles dissimilar to each other because the propagation times of propagating waves vary and because the computation of the similarity between waveforms is performed within a predetermined range of propagation time. When no break is present on the rails, the waveform from one of the two vibration sensors 1 and 2a has a waveform profile that is attenuated as compared to the waveform from the other.

Note that, according to the first and second embodiments, not only a break of a rail but also deterioration of a rail can be detected. Note that deterioration herein refers to a state in which abnormality has occurred inside a rail although no break is observed from the appearance of the rail.

With a technology using resonance frequencies of rails for rail break detection, a threshold for determination has to be set for each environment in which rails are laid. According to the first and second embodiments, a rail break is detected on the basis of similarity between vibrations of rails at two or more different positions, which is not affected by the material of the rails, the way in which the rails are laid, and the ground on which the rails are laid, and setting of a threshold for detecting a rail break thus need not be set for each environment in which the rails are laid.

In addition, with a technology of detecting a break of a rail by referring to a currant value, a partial break of a rail cannot be detected. According to the first and second embodiments, since current is not used, a partial rail break can be detected. Note that, while the vibration waveform when a rail break is present as illustrated in FIG. 7 is dissimilar to the vibration waveform when no rail break is present as illustrated in FIG. 6, a vibration waveform similar to the vibration waveform when no rail break is present as illustrated in FIG. 6 is obtained with a small RMS value when a partial rail break is present.

In addition, with a technology of detecting a break on a rail by comparing image data of left and right rails, image sensors for acquiring image data are vulnerable to dirt and it is envisaged that oil mist and iron powder adhere to image sensors, which requires frequent maintenance work. In the first and second embodiments, such frequent maintenance work is not needed.

In addition, since vibration information data obtained by measurement by a plurality of vibration sensors are compared, vibration caused by a vehicle crossing a railroad crossing or the like are cancelled out by the comparison. Thus, no false detection occurs owing to the crossing. While cases where two vibration sensors are used have been presented in the first and second embodiments, the present invention is not limited thereto and the number of vibration sensors may be any number larger than one.

Note that the first and second embodiments are preferably applied to a section including a curve on a railroad. Specifically, it is preferable that any one of sections for detection by the vibration sensors include a curve of a railroad. This is because a grail break is likely to be caused by friction with wheels at a curve on a railroad. Application to a curve with a small radius of curvature on a railroad is particularly preferable.

Note that the first and second embodiments are also preferably applied to a section including a weld on a railroad. Specifically, it is preferable that any one of sections for detection by the vibration sensors include a weld of a railroad. This is because a rail break is likely to occur at a weld on a railroad.

Third Embodiment

The present invention is not limited to the embodiments described in the first and second embodiments, but can also be applied to a radio train control system called communications based train control (CBTC). In the present embodiment, an example of application to CBTC will be described. Note that, for details in the present embodiment that have already been described in the first and second embodiments, the first and second embodiments are to be referred to and redundant description will not be repeated.

Figure 10:
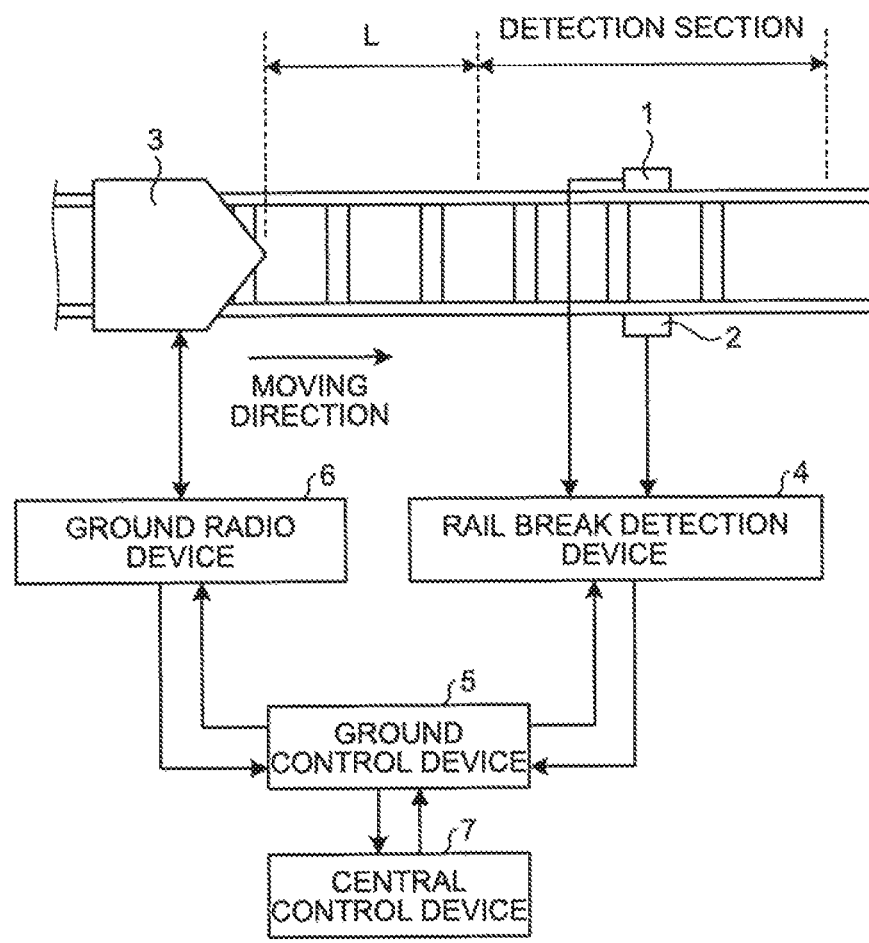

FIG. 10 is a first diagram illustrating a rail break detection device 4 according to the third embodiment of the present invention and structures in the vicinity. FIG. 10 illustrates, similarly to FIG. 1, a vibration sensor 1, which is a first vibration sensor mounted on one of two rails, a vibration sensor 2, which is a second vibration sensor mounted on the other of the two rails at a position facing the vibration sensor 1, a train 3 that moves along the two rails, and the rail break detection device 4. The vibration sensors 1 and 2 measure vibration of the rails. The train 3 is moving along the two rails in the direction toward the vibration sensors 1 and 2.

In FIG. 10, the same detection section is set for the vibration sensors 1 and 2 on the respective rails on which the vibration sensors 1 and 2 are mounted. The distance from an end of the detection section to the vibration sensors 1 and 2 is a distance within which the vibration sensors 1 and 2 can detect a rail break. Although not illustrated, a plurality of vibration sensors are provided on the rails on which the vibration sensors 1 and 2 are mounted so as to allow detection of a rail break in adjacent sections, and adjacent detection sections of the vibration sensors may overlap with each other. Adjacent detection sections of the vibration sensors partially overlapping with each other allow rail break detection without leaving a section in which a rail break cannot be detected on the rails. The vibration sensors 1 and 2 are preferably arranged at the center of the detection section, but the positions of the vibration sensors 1 and 2 are not limited as long as the positions are within the detection section.

A ground radio device 6 communicates with a train radio device, which is not illustrated, mounted on the train 3 to acquire position information and speed information of the train 3, and transmits the acquired information to a ground control device 5. The rail break detection device 4 transmits a result of rail break detection to the ground control device 5.

A central control device 7 is connected with the ground control device 5. The central control device 7 receives the position information and the speed information of the train 3 and the result of rail break detection from the ground control device 5, and controls operation of the train 3. In a case where the result of rail break detection indicates presence of a rail break, the central control device 7 transmits an instruction to stop the train 3 to the train 3 via the ground control device 5 and the ground radio device 6 so as to stop the train 3.

In addition, the rail break detection device 4 detects a rail break in the detection section of the vibration sensors 1 and 2 at a timing when the train 3 is moving at a point at a distance equal to or longer than a braking distance L of the train 3 before the end of the detection section of vibration sensors 1 and 2 on the side from which the train 3 is coming, and transmits the result of detection to the ground control device 5. The braking distance L can be calculated from the speed information of the train 3 and a coefficient of rolling friction. In a case where the result of detection indicates presence of a rail break, the central control device 7 can stop the train 3 before the train 3 enters the detection section of the vibration sensors 1 and 2 by performing control to stop the train 3 via the ground control device 5 and the ground radio device 6. Thus, according to the configuration of FIG. 10, a rail break can be detected and the train 3 can be stopped before the train 3 passes through the position of the rail break. Since the position information and the speed information of the train 3 are transmitted to the rail break detection device 4, the braking distance L of the train 3 can be calculated by the rail break detection device 4. Alternatively, the braking distance L may be calculated by the ground control device 5 or the central control device 7.

Figure 11:
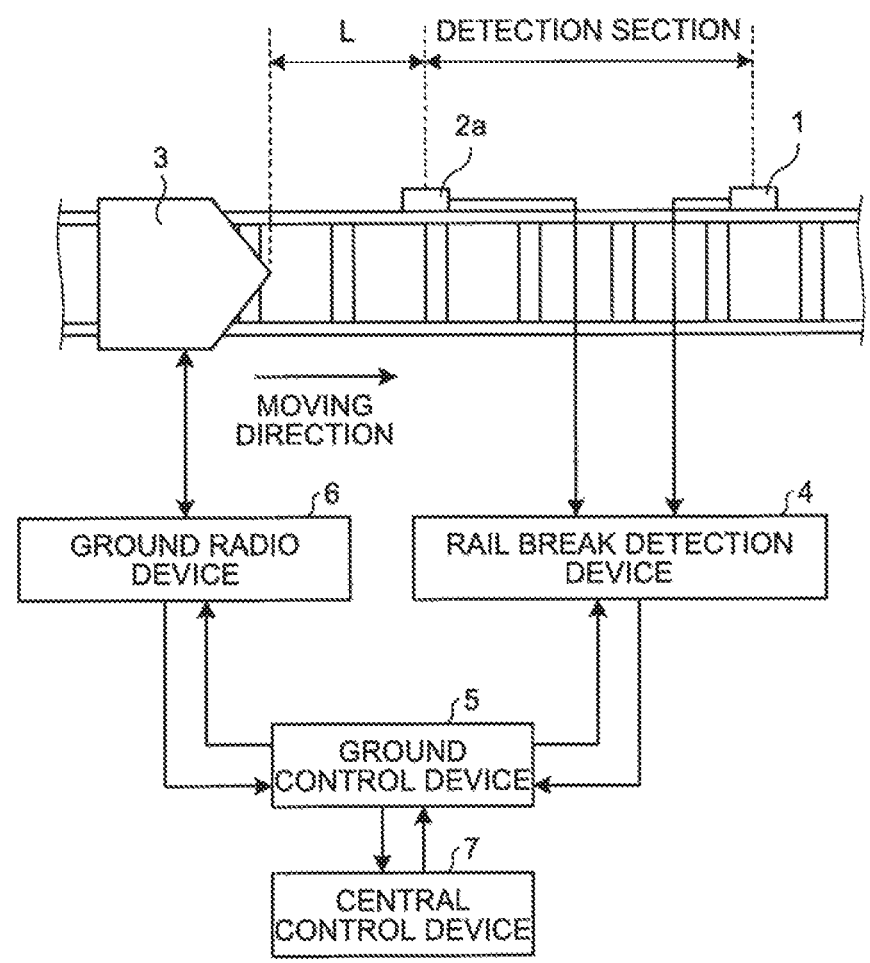

FIG. 11 is a second diagram illustrating the rail break detection device 4 according to the third embodiment of the present invention and structures in the vicinity. FIG. 11 illustrates, similarly to FIG. 9, the vibration sensor 1, which is the first vibration sensor mounted on one of two rails, a vibration sensor 2a, which is the second vibration sensor mounted on the same rail as the rail on which the vibration sensor 1 is mounted, the train 3 that moves along the two rails, and the rail break detection device 4. The vibration sensors 1 and 2a measure vibration of the rail. The train 3 is moving along the two rails in the direction toward the vibration sensors 1 and 2a.

In FIG. 11, a section between the vibration sensor 1 and the vibration sensor 2a is set as the detection section. Specifically, the positions at which the vibration sensor 1 and the vibration sensor 2a are installed are ends of the detection section, and the distance between the vibration sensor 1 and the vibration sensor 2a is a distance within which the vibration sensors 1 and 2a can detect a rail break. Although not illustrated, vibration sensors are similarly mounted the rail on which the vibration sensors 1 and 2a are not mounted. In addition, other vibration sensors are provided before the vibration sensor 1, so that adjacent detection sections of vibration sensors are arranged continuously similarly to FIG. 10, which allows rail break detection without leaving a section in which a rail break cannot be detected on the rails.

Similarly to FIG. 10, the ground radio device 6 communicates with the train radio device, which is not illustrated, mounted on the train 3 to acquire position information and speed information of the train 3, and transmits the acquired information to the ground control device 5. The rail break detection device 4 transmits a result of rail break detection to the ground control device 5.

The central control device 7 is connected with the ground control device 5. The central control device 7 receives the position information and the speed information of the train 3 and the result of rail break detection from the ground control device 5, and controls operation of the train 3. In a case where the result of rail break detection indicates presence of a rail break, the central control device 7 transmits an instruction to stop the train 3 to the train 3 via the ground control device 5 and the ground radio device 6 so as to stop the train 3.

In addition, the rail break detection device 4 detects a rail break in the detection section defined by the vibration sensor 1 and the vibration sensor 2a at a timing when the train 3 is moving at a point at a distance equal to or more than the braking distance L of the train 3 before the vibration sensor 2a, and transmits the result of detection to the ground control device 5. In a case where the result of detection indicates presence of a rail break, the central control device 7 can stop the train 3 before the train 3 enters the detection section defined by the vibration sensor 1 and the vibration sensor 2a by performing control to stop the train 3 via the ground control device 5 and the ground radio device 6. Thus, according to the configuration of FIG. 11, a rail break can be detected and the train 3 can be stopped before the train 3 passes through the position of the rail break. Since the position information and the speed information of the train 3 are transmitted to the rail break detection device 4, the braking distance L of the train 3 can be calculated by the rail break detection device 4. Alternatively, the braking distance L may be calculated by the ground control device or the central control device 7.

AB described above, according to the configuration of the present embodiment, a rail break can be detected and a train can be stopped before the train passes through the position of the rail break.

Fourth Embodiment

In a case where vibration caused by a moving train is used as a vibration source of rail vibration or a case where vibration excited by a moving train such as a case where the train speed is low, a rail break may not be detected. Thus, in the present invention, a vibration exciter may be provided adjacent to a vibration sensor. In the present embodiment, an embodiment in which vibration exciters are provided adjacent to the vibration sensors in the configuration of the third embodiment will be described. Note that, for details in the present embodiment that have already been described in the first to third embodiments, the first to third embodiments are to be referred to and redundant description will not be repeated. While the embodiment in which vibration exciters are provided adjacent to the vibration sensors in the configuration of the third embodiment will be described in the present embodiment, the configuration of the present embodiment may be combined with the first or second embodiment.

Figure 12:
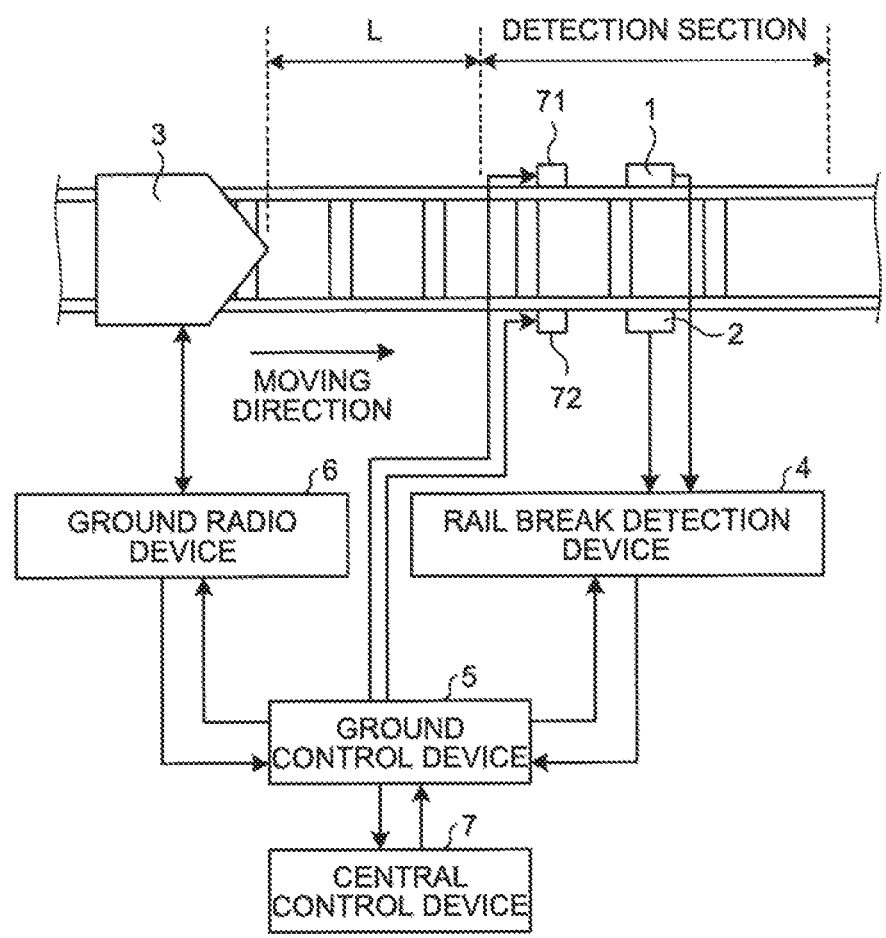

FIG. 12 is a first diagram illustrating a rail break detection device 4 according to the fourth embodiment of the present invention and structures in the vicinity. FIG. 12 illustrates, similarly to FIG. 1, a vibration sensor 1, which is a first vibration sensor mounted on one of two rails, a vibration sensor 2, which is a second vibration sensor mounted on the other of the two rails at a position facing the vibration sensor 1, a train 3 that moves along the two rails, and the rail break detection device 4. The vibration sensors 1 and 2 measure vibration of the rails. The train 3 is moving along the two rails in the direction toward the vibration sensors 1 and 2. A vibration exciter 71 is provided before the vibration sensor 1 in the moving direction of the train 3, and a vibration exciter 72 is provided before the vibration sensor 2 in the moving direction of the train 3.

The vibration exciters 71 and 72 applies vibration to the respective rails on which the vibration exciters 71 and 72 are installed at a timing when the train 3 is at a position at a distance equal to or longer than the braking distance L from the end of the detection section in accordance with an instruction from the central control device 7. The rail break detection device 4 detects a rail break by using the vibrations caused by the vibration exciters 71 and 72. For the vibration exciters 71 and 72, any vibration exciters that can apply vibration to rail may be used, such a those having a configuration in which a piston hits a rail by electromagnetic force, for example.

Figure 13:
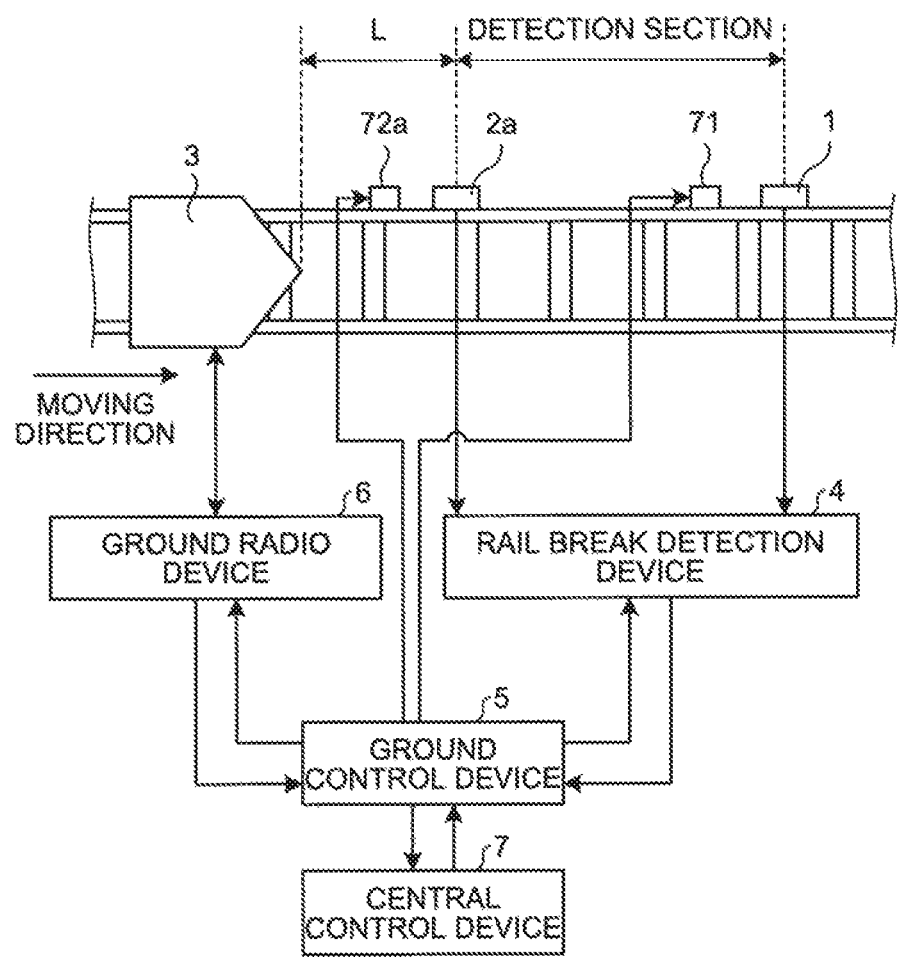

FIG. 13 is a second diagram illustrating a rail break detection device 4 according to the fourth embodiment of the present invention and structures in the vicinity. FIG. 13 illustrates, similarly to FIG. 9, the vibration sensor 1, which is the first vibration sensor mounted on one of two rails, a vibration sensor 2a, which is the second vibration sensor mounted on the same rail as the rail on which the vibration sensor 1 is mounted, the train that moves along the two rails, and the rail break detection device 4. The vibration sensors 1 and 2a measure vibration of the rail. The train 3 is moving along the two rails in the direction toward the vibration sensors 1 and 2a. A vibration exciter 71 is provided before the vibration sensor 1 in the moving direction of the train 3, and a vibration exciter 72a is provided before the vibration sensor 2a in the moving direction of the train 3.

Similarly to FIG. 12, the vibration exciters 71 and 72a applies vibration to the respective rails on which the vibration exciters 71 and 72a are installed at a timing when the train 3 is at a position at a distance equal to or longer than the braking distance L from the end of the detection section in accordance with an instruction from the central control device 7 via the ground control device 5. The rail break detection device 4 detects a rail break by using the vibrations caused by the vibration exciters 71 and 72a.

While the vibration exciters 71 and 72 or 72a applies vibration in accordance with an instruction from the central control device 7 in the present embodiment, the present invention is not limited thereto. The rail break detection device 4 or the ground control device 5 may output an instruction to apply vibration to the vibration exciters 71 and 72 or 72a at a timing of rail, break detection.

While the vibration exciters 71 and 72 or 72a are provided before the vibration sensors 1 and 2 or 2a since the train 3 moves in one direction in FIGS. 12 and 13 the present invention is not limited thereto. In a case where a railroad is a single track line, for example, vibration exciters may be provided on respective sides of a vibration sensor since the moving direction of the train is switched.

As described above, according to the configuration of the present embodiment, even in a case where vibration excited by a moving train such as a case where the train speed is low, a rail break can be detected and a train can be stopped before the train passes through the position of the rail break by using vibration applied by a vibration exciter.

Note that, according to the present embodiment, even in a case where no train moves on the rails during non-service hours, a rail break can be detected by using vibration applied by a vibration exciter.

Fifth Embodiment

While only the train 3 is illustrated on the rails and embodiments in which a rail break is detected by using vibration caused by the train 3 have been described in the first to fourth embodiments the present invention is not limited thereto. In the present invention, a rail break can also be detected by using both of vibration caused by a train 3 present before a vibration sensor in the moving direction of the train and vibration caused by a train 3a present ahead of the vibration sensor in the moving direction. Note that, for details in the present embodiment that have already been described in the first to fourth embodiments, the first to fourth embodiments are to be referred to and redundant description will not be repeated. Note that, in the present embodiment, an embodiment in which a train 3 is present before the vibration sensors in the train moving direction in the configuration of the third embodiment and a train 3a is present ahead of the vibration sensors in the configuration of the third embodiment will be described.

Figure 14:
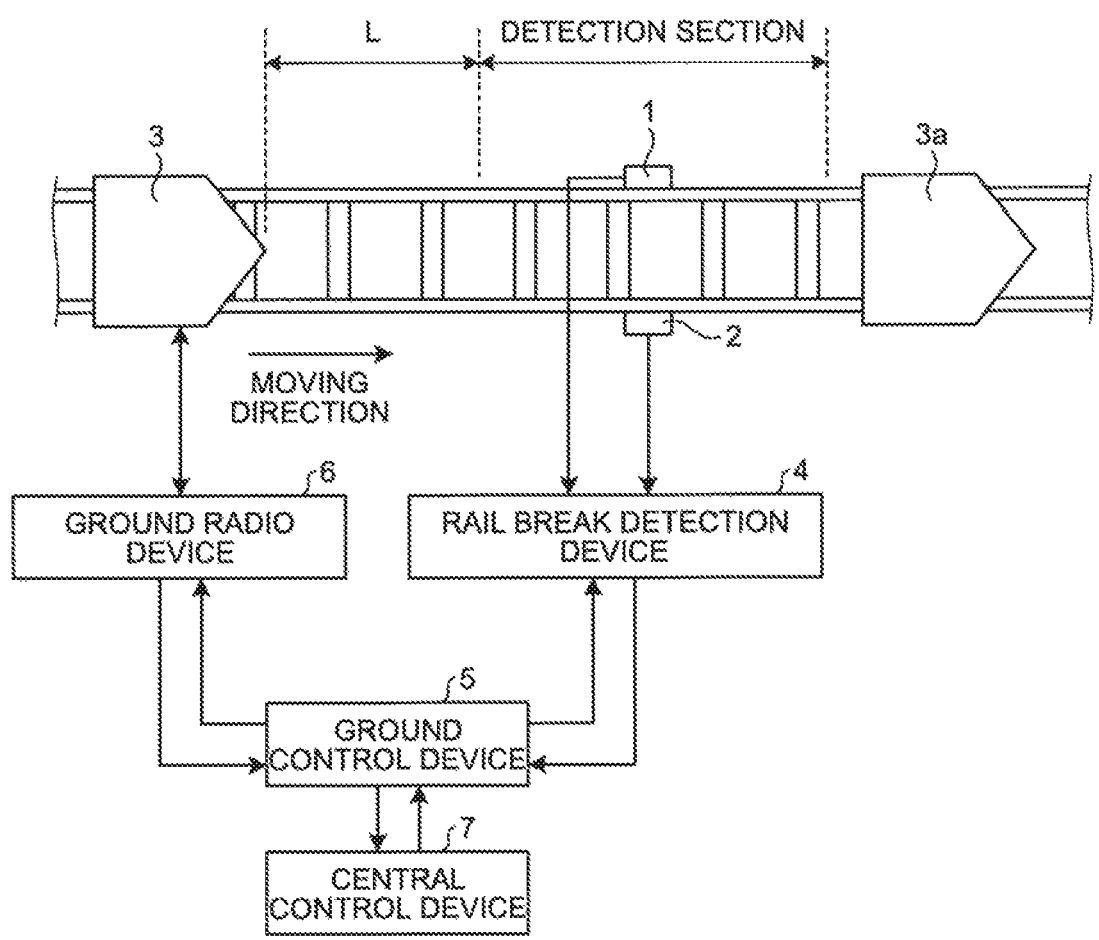

FIG. 14 is a first diagram illustrating a rail break detection device 4 according to the fifth embodiment of the present invention and structures in the vicinity FIG. 14 illustrates, similarly to FIG. 1, a vibration sensor 1, which is a first vibration sensor mounted on one of two rails, a vibration sensor 2, which is a second vibration sensor mounted on the other of the two rails at a position facing the vibration sensor 1, a train 3 that is moving along the two rails at a position before the vibration sensors 1 and 2 in the train moving direction, a train 3a that is moving along the two rails at a position ahead of the vibration sensors 1 and 2 in the moving direction, and the rail break detection device 4. The vibration sensors 1 and 2 measure vibration of the rails. The train 3 is moving along the two rails in the direction toward the vibration sensors 1 and 2, and the train 3a is moving along the two rails in the direction away from the vibration sensors 1 and 2.

For the waveform of the vibration caused by the train 3, which is vibration occurring when the train 3 moves toward the vibration sensors 1 and 2, an impulse waveform is used. For the waveform of the vibration caused by the train 3a, which is vibration occurring when the train 3a moves away from the vibration sensors 1 and 2, a continuous waveform is used. The rail break detection device 4 determines the similarity between two impulse waveforms, which are obtained by separation by the waveform separation units 41 and 42, by the impulse waveform similarity determination unit 44, and determines the similarity between two continuous waveforms, which are obtained by separation by the waveform separation units 41 and 42, by the continuous waveform similarity determination unit 45. Since the method for determining the similarity of waveforms is described in the first embodiment, the description is not repeated here. When the two impulse waveforms are dissimilar to each other as a result of the determination, it is determined that a rail break has occurred between the train 3 and the vibration sensors 1 and 2. When the two continuous waveforms are dissimilar to each other, it is determined that a rail break has occurred between the train 3a and the vibration sensors 1 and 2. In this manner, a rail break can be detected by using vibration waveforms caused by a plurality of compositions.

FIG. 15 is a second diagram illustrating a rail break detection device 4 according to the fifth embodiment of the present invention and structures in the vicinity. FIG. 15 illustrates, similarly to FIG. 5, a vibration sensor 1, which is a first vibration sensor mounted on one of two rails, a vibration sensor 2a, which is a second vibration sensor mounted on the same rail as the rail on which the vibration sensor 1 is mounted, a train 3 that is moving along the two rails at a position before the vibration sensors 1 and 2a in the train moving direction, a train 3a that is moving along the two rails at a position ahead of the vibration sensors 1 and 2a in the moving direction, and the rail break detection device 4. The vibration sensors 1 and 2a measure vibration of the rail. The train 3 is moving along the two rails in the direction toward the vibration sensors 1 and 2a, and the train 3a is moving along the two rails in the direction away from the vibration sensors 1 and 2a.

In FIG. 15, determination is performed similarly to FIG. 14, and when two impulse waveforms or two continuous waveforms are dissimilar to each other as a result of the determination, it is determined that a rail break has occurred between the vibration sensor 1 and the vibration sensor 2a. In this manner, a rail break can be detected by using vibration waveforms caused by a plurality of compositions.

According to the present embodiment, a rail break can be detected by using vibration waveforms caused by a plurality of compositions. In addition, the present embodiment is also applicable to a radio train control system similarly to the third embodiment, which allows the train 3 to be stopped before passing through the position of a rail break when the rail break is detected.

Sixth Embodiment

While an embodiment in which a rail break is detected by using vibration generated by applying vibration to the rails by the vibration exciters has been described in the fourth embodiment, vibration is applied a plurality of times by vibration exciters and an average of a plurality of waveforms generated by the plurality of times of application of vibration is calculated in the present embodiment.

Note that the last application of vibration among the plurality of times of vibration application is performed at a timing when the train 3 is at a position at a distance equal to or longer than the braking distance L from the end of the detection section.

The present embodiment allows measurement of very weak vibration, which allows the sensors to be arranged at longer intervals.

The configurations presented in the embodiments above are examples of the present invention, which can be combined with other known technologies or can be partly omitted or modified without departing from the scope of the present invention.

REFERENCE SIGNS LIST 1, 2, 2a vibration senator; 3, 3a train; 4 rail break detection device; 5 ground control device; 6 ground radio device; 7 central control device; 41, 42 waveform separation unit; 43 waveform similarity determination unit; 44 impulse waveform similarity determination unit; continuous waveform similarity determination unit 46 processor; 47 memory; 48 input unit; 51, 52, 61, 62 output waveform; 71, 72, 72a vibration exciter.

The invention claimed is:

1. A rail break detector to which output waveforms are input from a plurality of vibration sensors mounted on different positions on rails, the rail break detector comprising:
  a waveform similarity determiner to compare impulse waveforms separated from the output waveforms output from the vibration sensors when a train is moving towards first and second vibration sensors and compare continuous waveforms separated from the output waveforms when the train is moving away from the first and second vibration sensors, and determine similarity between the impulse waveforms and between the continuous waveforms, wherein a break of the rails is detected on the basis of the similarity, wherein the waveform similarity determiner determines that there is no break of the rails when the compared impulse waveforms when the train is moving towards the first and second vibration sensors are similar and the compared continuous waveforms when the train is moving away from the first and second vibration sensors are similar, and wherein the waveform similarity determiner determines that there is the break of the rails when the compared impulse waveforms when the train is moving towards the first and second vibration sensors are dissimilar or the compared continuous waveforms when the train is moving away from the first and second vibration sensors are dissimilar.

2. The rail break detector according to claim 1, wherein the vibration sensors are mounted on different rails parallel to each other, and wherein the comparison of the impulse waveforms or the comparison of the continuous waveforms are associated with the vibration sensors mounted on the different rails parallel to each other.

3. The rail break detector according to claim 1, wherein the vibration sensors are mounted on one rail.

4. The rail break detector according to claim 1, wherein any one of detection sections of the vibration sensors includes a curve of a railroad.

5. The rail break detector according to claim 1, wherein any one of detection sections of the vibration sensors includes a weld of a railroad.

6. A rail break detector to which a first output waveform from a first vibration sensor mounted on rails and a second output waveform from a second vibration sensor mounted at a different position from the first vibration sensor are input, the rail break detector comprising:

a waveform similarity determiner to compare a first impulse waveform separated from the first output waveform with a second impulse waveform separated from the second output waveform when a train is moving towards the first and second vibration sensors and compare a first continuous waveform separated from the first output waveform with a second continuous waveform separated from the second output waveform when the train is moving away from the first and second vibration sensors, and determine similarity between the first impulse waveform and the second impulse waveform and between the first continuous waveform and the second continuous waveform, wherein a break of rails is detected on the basis of the similarity, wherein the waveform similarity determiner determines that there is no break of the rails when the compared impulse waveforms when the train is moving towards the first and second vibration sensors are similar and the compared continuous waveforms when the train is moving away from the first and second vibration sensors are similar, and wherein the waveform similarity determiner determines that there is the break of the rails when the compared impulse waveforms when the train is moving towards the first and second vibration sensors are dissimilar or the compared continuous waveforms when the train is moving away from the first and second vibration sensors are dissimilar.

7. The rail break detector according to claim 6, wherein the first vibration sensor and the second vibration sensor are mounted on different rails parallel to each other, and wherein the comparison of the first and second impulse waveforms or the comparison of the first and second continuous waveforms are associated with the vibration sensors mounted on the different rails parallel to each other.

8. The rail break detector according to claim 6, wherein the first vibration sensor is mounted on a same rail as the second vibration sensor.

9. The rail break detector according to claim 6, wherein a detection section of the first and second vibration sensors includes a curve or a railroad.

10. The rail break detector according to claim 6, wherein a detection section of the first and second vibration sensors includes a weld of a railroad.

11. The rail break detector according to claim 6, wherein a break on the rails is detected before the train moving along the rails enters a detection section of the first and second vibration sensors on the basis of position information and speed information of the train.

12. The rail break detector according to claim 6, wherein a vibration exciter is provided before the first and second vibration sensors in a moving direction of the train.

13. The rail break detector according to claim 12, wherein
the vibration exciter applies vibration a plurality of times to a rail on which the vibration exciter is mounted,
an average of a plurality of vibration waveforms obtained by the first vibration sensor through a plurality of times of application of vibration is used as an output waveform of the first vibration sensor, and
an average of a plurality of vibration waveforms obtained by the second vibration sensor through a plurality of times of application of vibration is used as an output waveform of the second vibration sensor.

14. The rail break detector according to claim 6, wherein
in an instance where the train is moving towards the first and second vibration sensors and the first impulse waveform and the second impulse waveform are dissimilar to each other, the rail break detector detects that a rail break is present between the train and the first and second vibration sensors, or
in an instance where the train is moving away from the first and second vibration sensors and the first continuous waveform and the second continuous waveform are dissimilar to each other, the rail break detector detects that a rail break is present between the train and the first and second vibration sensors.

15. The rail break detector according to claim 6, wherein
when the train is moving towards the first and second vibration sensors and the first impulse waveform and the second impulse waveform are dissimilar to each other, the rail break detector detects that a rail break is present between the train and the first and second vibration sensors.

16. A rail break detector to which a first output waveform from a first vibration sensor mounted on rails and a second output waveform from a second vibration sensor mounted at a different position from the first vibration sensor are input, the rail break detector comprising:

a first waveform separator to separate the first output waveform of the first vibration sensor and output a first impulse waveform and a first continuous waveform;

a second waveform separator to separate the second output waveform of the second vibration sensor and output a second impulse waveform and a second continuous waveform; and a waveform similarity determiner to perform a comparison between the first impulse waveform and the second impulse waveform when a train is moving towards the first and second vibration sensors and comparison between the first continuous waveform and the second continuous waveform when the train is moving away from the first and second vibration sensors, and determine similarity between the first impulse waveform and the second impulse waveform and between the first continuous waveform and the second continuous waveform, wherein a break of rails is detected on the basis of the similarity, wherein the waveform similarity determiner determines that there is no break of the rails when the first and second impulse waveforms when the train is moving towards the first and second vibration sensors are similar and the first and second continuous waveforms when the train is moving away from the first and second vibration sensors are similar, and wherein the waveform similarity determiner determines that there is the break of the rails when the first and second impulse waveforms when the train is moving towards the first and second vibration sensors are dissimilar or the first and second continuous waveforms when the train is moving away from the first and second vibration sensors are dissimilar.

* * * * *